United States Patent Office 3,528,823
Patented Sept. 15, 1970

3,528,823
FLUID SHORTENING
Jack L. Rossen, Englewood, N.J., assignor to Lever Brothers Company, New York, N.Y., a corporation of Maine
No Drawing. Filed Aug. 4, 1966, Ser. No. 570,157
Int. Cl. A23d 5/00
U.S. Cl. 99—118                 22 Claims

ABSTRACT OF THE DISCLOSURE

A fluid shortening for use in baking comprising 0.1% to 4% of an ester of polyglycerol, 1% to 10% of normally solid triglyceride, 2% to 15% of an ester of propylene glycol, and the balance being essentially edible normally liquid triglyceride. The polyglycerol ester and the normally solid triglyceride are crystals of fat primarily in the beta phase suspended in the liquid triglyceride-propylene glycol ester solution.

---

This invention relates to a fluid shortening composition for use in baking, and to a method for making it.

Shortenings available for baking have included natural fats which are solid or plastic at room temperatures, including fatty animal tissues, butter and lard; compounded or blended shortenings made from mixtures of naturally hard fats or hydrogenated vegetable oils with liquid, soft or partially hydrogenated vegetable oils; all hydrogenated shortenings made by selectively hydrogenating a blend of liquid vegetable oils to obtain the desired finished properties; and superglycerinated shortenings which are generally all-hydrogenated shortenings containing an increased proportion of combined glycerol in the form of mono- and diglycerides, primarily monoglycerides, over that found in ordinary fat.

Liquid oils such as cottonseed, soybean, olive, rapeseed, corn and sunflower seed oil may be treated by a "winterizing" process to remove ingredients which tend to precipitate and settle out at low temperatures and sometimes cause the oil to congeal. The materials so produced are known as salad oils. Recently liquid oils, particularly salad oils, have been recommended for the preparation of a variety of cakes. However, such oils are not suitable for the preparation of conventional high volume cakes containing a high ratio of sugar to flour. Cakes of this type having an even close grain, tender crust and soft texture are in the greatest demand among consumers whether home-baked or commercially prepared. These qualities are normally obtainable in the highest degree when using all hydrogenated, superglycerinated plastic shortenings.

The superior performance of plastic shortenings in cake-making results to a large degree from their ability to entrap and hold considerable quantities of air during the mixture of batters and doughs. This air contributes a leavening action to the baking process. The trapping of air by fat in mixing batters and doughs is referred to as creaming.

Superglycerinated plastic shortenings are more efficient than other plastic shortenings in producing cakes having optimum properties due to the effectiveness of the monoglycerides as emulsifiers which promote a thorough and fine dispersion of fat in the batter, thus resulting in a high degree of dispersion of the desirable trapped air. Plastic shortenings have the disadvantage, however, that they are difficult to measure. Consumers would welcome a liquid shortening which could be readily measured and poured, provided it could approach or meet the cake-making performance of superglycerinated shortenings.

Oils such as salad oils, do not have good creaming action, and it is for this reason that they do not provide good cake-making performance. It is believed that the liquid oils disperse in batters and doughs in the form of spherical droplets which have less surface in contact with the other batter ingredients and less ability to trap and disperse air than do plastic shortenings, which appear to disperse in sheets and films. To overcome this deficiency, there have been a number of proposals in the art for providing certain specific emulsifying agents in salad oils. Experience had indicated that the ability of emulsifying agents to convert ordinary oils into liquid shortenings which have cake-making performance equal to that of plastic superglycerinated shortenings is highly specific. For example, the addition of monoglycerides to a salad oil is of little value in improving the baking performance thereof. However, if the salad oil contains a minor amount of suspended, substantially saturated fatty glycerides in the form of β-phase crystals in addition to a minor amount of monoglycerides (in the order of 1% to 2%), acceptable cake-baking properties will be obtained. Other proposals which have been found to produce acceptable fluid-baking shortenings have been based upon the use of lactic acid derivatives as emulsifiers or upon the use of solid fatty materials incorporating specific fatty radicals or combinations thereof.

In accordance with the present invention, a novel emulsifier system for oils has been discovered which provides fluid shortenings having exceptional cake-baking performance. More specifically, in accordance with the present invention, a composition is provided which consists essentially of:

(a) From 0.1% to 4% by weight of at least one ester of polyglycerol, the polyglycerol containing less than about 25% of free glycerin, and having between about 1 and 3 mols of fatty acid per mol of polyglycerol;

(b) From about 2% to about 15% of at least one monoester of propylene glycol;

(c) From about 1% to about 10% of at least one normally solid triglyceride having an iodine value of less than about 20, the normally solid triglyceride being predominantly in the "β-phase"; and (d) The balance of the composition being essentially a normally liquid triglyceride vehicle.

The final composition should be characterized by solid fat index values within the following ranges.

° C.:
| | |
|---|---|
| 0 | 15–25 |
| 21.1 | 7–15 |
| 33.3 | 4–12 |
| 42.0 | 3–12 |

In the present invention a method for preparing compositions of the foregoing description has also been found. Specifically, the fluid-baking shortenings of the present invention are prepared by the following process:

(a) The normally solid triglycerides and the polyglycerol ester are dissolved in a portion of the liquid vehicle at a temperature sufficient to yield a clear liquid to form a concentrate. The amount of the normally liquid vehicle used should be sufficient that the concentration of the normally solid components (i.e. the normally solid triglyceride and the polyglycerol ester) in the concentrate will be between about 30% and 60% by weight.

(b) The propylene glycol monoester is dissolved in the balance of the liquid vehicle to form a diluent and the temperature of the diluent is brought to a temperature between about 60° and 90° F.

(c) The hot concentrate is added to the diluent with agitation. This results in the rapid precipitation of the normally solid components of the concentrate as a coarse, flocculent solid.

(d) The suspended precipitate is comminuted to produce a stable suspension. The resulting suspension is creamy in appearance and has the major portion of the precipitated solids in a particle size range of 0.3 to 15µ.

Polyglycerol esters suitable for use in the present invention may, in general, be prepared by the condensation of glycerin to yield a polyglycerol, followed by esterification of the polyglycerol condensation product. The polyglycerol may have an average molecular weight corresponding to a theoretical condensation product of from 2 to about 10 glycerin units, but should contain less than about 25% unreacted glycerin. Preferably, the amount of unreacted glycerin is as low as possible. In its usual commercial form this product is referred to as a polyglycerol having (for example) 2, 3, 6 or 10 glycerin units, i.e. diglycerol, triglycerol, hexaglycerol or decaglycerol. These refer to an average molecular weight which corresponds to the indicated number of glycerin units in products typically containing a mixture of glycerol polymers varying from 2 to 10 glycerin units.

The fatty acids with which the polyglycerols are esterified may contain from about 14 to 22 carbon atoms, and may be either saturated or consist partially of mono-olefinically unsaturated acids. Typical acids include myristic, palmitic, stearic, arachidic, and behenic. Typical unsaturated fatty acids which may be used include oleic, and a mixed $C_{18}$–$C_{22}$ unsaturated fatty acid. The fatty acid component of the polyglycerol ester should have an iodine value of not more than about 50 and preferably less than 20.

The molar ratio between the fatty acid and plyglycerol in the polyglycerol ester should normally be not more than about 3. For best results, fatty acid-polyglycerol ester ratios should be between about 1 and 2. These lower ratios provide greater emulsification activity, which is believed to be attributable to the higher proportion of free hydroxyl groups. (It should be understood, however, that the foregoing is by way of explanation only, and is not intended to limit the scope of the present invention.)

Typical polyglycerol esters which may be used in the present invention are described in greater detail in U.S. Pat. 3,230,090, except that for purposes of the present invention, the fatty acid of the esters should contain at least 14 carbon atoms.

The amount of polyglycerol esters which may be used in the present invention varies between about 0.1% and 4% (based on the weight of the finished composition). Preferably, the fluid-baking shortenings of the present invention contain between about 0.2% and 2.0% polyglycerol ester.

The propylene glycol monoester component is the monoester of propylene glycol (e.g. 1,2 propanediol) with saturated fatty acids having from about 14 to 22 carbon atoms of the same type as described above with respect to the polyglycerol ester except that they must be subsantially fully saturated. The finished ester should have an iodine value of not more than about 10. In general, as indicated above, from about 2% to 15% by weight of the propylene glycol monoester is present. Preferably, however, about 6% to 12% thereof is employed. Higher percentages may be used if desired; however, such higher percentages offer no performance advantages.

For commercial purposes, the propylene glycol monoester is generally available as a mixture of the monoester and diester in about equal proportions. Accordingly, the commercial propylene glycol monoesters would be employed in a range from about 4% to 30% in order to provide the desired amount (between about 2% and 15%) of the pure monoester component.

A typical commercially available propylene glycol monoester with commercial stearic acid (45% stearic acid and 55% palmitic acid) contains about 1% free fatty acid, has an iodine value of approximately 1.0, contains about 52% to 58% of the monoester and about 1% free propylene glycol. It has a melting point of 110° F. and is soluble in the normally liquid glyceride oils used as a vehicle in the present invention at 80° F. up to about 25% by weight.

The normally solid triglyceride is a triglyceride fat which may typically have between 12 and 22 carbon atoms. The triglyceride may be of natural or synthetic sources. In general, if the triglyceride contains a significant amount of unsaturation, it should be hydrogenated so that it will have an iodine value of less than 20. Where high-lauric oils are used, such as coconut oil, babassu oil, palm kernel oil and ouri-curi oil, it is preferred that the iodine value be less than about 2.

A preferred oil which has been found to be particularly useful in the present invention is hydrogenated soybean oil having an iodine value of less than about 20. Other typical oils which may be used (if suitably hydrogenated), include, but are not limited to, rapeseed, cottonseed, tallow, lard, peanut, ucuhuba, etc.

The normally solid triglyceride will constitute between about 1% and 10% by weight of the final composition. Additionally, the final composition should have solid fat index values within the following ranges.

° C.:
| | |
|---|---|
| 0 | 15–25 |
| 21.1 | 7–15 |
| 33.3 | 4–12 |
| 42.0 | 3–12 |

The solid fat index is an empirical measure of the solid fat content in margarine oils and shortenings. It is determined by the standard American Oil Chemists Society Tentative Method Cd10–57. In order to interpret the solid fat index values, it is necessary to state the temperature at which the index is measured.

The liquid vehicles used in the present invention may be any edible normally liquid triglyceride oil. It may, or may not have been winterized (as would be done in the case of salad oils). Moreover, it need not be clear at room temperature, but may contain some separated or separable solid material. However, if solids are present, the amount thereof should be no greater than that which will cause the solid fat index of the finished composition to exceed the ranges set forth above.

Typical oils which may be used as the liquid vehicle include, but are not limited to, peanut oil (I.V.=83–98), rapeseed oil (I.V.=94–106), corn oil (I.V.=116–130), cottonseed oil (I.V.=103–115), soybean oil (I.C.=124–136), and safflower oil (I.V.=130–160). The foregoing oils may be partially hydrogenated, if desired, so long as they are not hydrogenated to an extent which will cause the solid-fat index values of the final composition to exceed the limits set forth above.

The method of preparing fluid-baking shortenings of the present invention has already been briefly described above. In greater detail, the several steps of the present invention are the following:

The initial step is the preparation of a concentrate of the normally solid ingredients in a portion of the liquid vehicle. As already indicated, these normally solid ingredients are the normally solid fats and the polyglycerol esters. In order to dissolve these ingredients in the liquid vehicle, elevated temperatures are required to obtain the clear liquid which is desired, generally in excess of 150° F. Manifestly, the temperature should not be so high as to cause oxidative degradation of the ingredients. Normally, therefore, temperatures in excess of about 180° F. are not used. In typical commercial operations, a dissolving temperature in the order of 155° to 168° F. is appropriate.

The amount of liquid vehicle used relative to the amount of normally solid ingredients is not of great importance, although it will be recognized that the greater the relative amount of the liquid vehicle, the more readily will the normally solid ingredients dissolve therein. Concentrates in which the normally solid ingredients are in a concentration of 30% to 50% have been successfully used. However, concentrations of up to as much as 60% dissolved solids may be employed if desired. Preferred concentrates will contain between about 50% and 60% solids.

The concentrate may be prepared in the form of several concentrate solutions. If this is done, however, at least one of the solutions should contain both of the polyglycerol ester and the normally solid triglyceride.

The balance of the ingredients of the formulation are prepared as the diluent, these constituting the major portion of the liquid vehicle and the propylene glycol monoester. As discussed above, the normally solid triglycerides and the polyglycerol esters together compose from about 1 to about 14 parts of the finished composition (by weight, based on 100 parts of finished shortening). Accordingly, to prepare a concentrate containing in the order of 50% solids will require the use of a similar amount (that is, in the order of 1 to 14 parts) of the normally liquid triglyceride vehicle. There will remain, therefore, for formulation into the diluent, from about 70 to about 98 parts of the finished material of which from 2 to 15 parts (by weight of the finished composition) will be the propylene glycol monoester, the balance being substantially the normally liquid triglyceride vehicle. It will be recalled, however, that for commercially practical purposes, the propyleneglycol monoester is normally employed as a 50–50 mixture of propylene glycol monoesters and propylene glycol diesters. The reference above to the presence of from 2 to 15 parts of the propylene glycol monoester is with respect to the pure monoester ingredients. Thus, a typical commercial material may contain from 2 to 15 parts of propylene glycol diesters in addition to the desired propylene glycol monoester and the normally liquid vehicle.

In many commercial operations it will be desirable to warm the diluent to about 100°–110° F. to promote the dissolution of the propylene glycol monoester. A substantially clear liquid solution should be obtained, although it is not necessary for the solution to be crystal clear. Before adding the concentrate, however, the diluent should be cooled (if necessary) so that its temperature does not exceed about 90° F.

As indicated above, after the diluent and concentrate have been prepared, they are combined by adding the concentrate to the diluent while agitating the latter. Because the diluent is at essentially room temperature, that is, between about 60° and 90° F., the hot concentrate is cooled by it, thereby causing the normally solid ingredients to precipitate. The freshly precipitated solid ingredients have a particle size which is undesirably high for a commercial fluid-baking shortening. Accordingly, following precipitation, the slurry of precipitated fats and liquid vehicle is refined to reduce the particle size of the former to particles in the order of 0.3 to 15 microns in diameter and to assure that the solids are at least 75% in the β-phase. With respect to the crystalline state of the normally solid materials, it should be noted that reference is made to the crystallinity of the solid phase which may contain both the normally solid triglyceride and the polyglycerol ester. (U.S. Pat. No. 2,521,242 more fully describes the β-phase fats and the identification of them.)

The refining step additionally improves the viscosity and emulsion stability. Finished, refined products will have viscosities measured by a Brookfield viscosimeter in the order of 2000 to 4000 cp. at a spindle speed of 20 r.p.m.

Refining may be effected by any of a number of techniques which are generally adapted to reduce the particle size of the precipitated fats. Commercially available homogenizers, colloid mills or combinations thereof may be employed. In addition, it is helpful to assure stable products to allow the homogenized material to be tempered by maintaining it at a temperature in the order of 80° to 100° F. for a period of ½ to 1½ hours following the termination of homogenization.

For a further understanding of the present invention, reference is had to the following examples.

In evaluating the baking qualities of the fluid-baking shortenings of the present invention, standardized baking tests have been employed. Different laboratories and bakeries vary considerably in their methods of expressing their judgment of cakes. Whatever evaluation method is used, the characteristics desirable in cakes are generally recognized in industry and in home. Descriptions of cake scoring methods may be found, for example, in the article by E. O. Stanberg in Cereal Chemistry, vol. 16, page 764 (1939) and the article by F. Hanning in Cereal Chemistry, vol. 29, page 177 (1952). In this laboratory, cakes are scored on the basis of symmetry, grain, volume, texture and eating quality using an hedonic scale.

In making the evaluation, the standardized cake-making recipes are as follows:

| Formula | Yellow Cake | | White Cake | |
|---|---|---|---|---|
| | Grams | Volume | Grams | Volume |
| Flour—"Softasilk" | 200 | 2 cups | 200 | 2 cups. |
| Sugar—"Fruit-Fine" | 265 | 1⅓ cups | 250 | 1¼ cups. |
| Baking Powder, "Calumet" | 10 | 2½ tsp | 14 | 3½ tsp. |
| Salt | 4 | 1 tsp | 4 | 1 tsp. |
| Shortening | 100 | ½ cup | 100 | ½ cup. |
| Whole Milk | 210 | 1 cup less 2 tbsp | 240 | 1 cup. |
| Eggs (fresh) | 100 | 2 (whole) | 90 | 3 egg whites. |
| Vanilla | 4 | 1 tsp | 4 | 1 tsp. |

The cake batters were prepared by the so-called "blending method," which is as follows:

The flour, sugar, baking powder and salt are sifted into a mixing bowl. The shortening, vanilla and ⅔ of the milk are then added, and the contents of the bowl are beaten for two minutes with an electric mixer (a Sunbeam Mixmaster at speed No. 6). The bowl and beater are then scraped with a flexible rubber spatula and the eggs and remaining milk are added. The batter is beaten for an additional two minutes at the No. 6 speed. Following an additional scraping and mixing with the rubber spatula, the batter line is measured. The batter is then split into each of two paper-lined and greased 8-inch layer cake tins. For yellow cake, the cakes were baked at 375° F. for 24 minutes. For white cake, baking was at 375° F. for 22 minutes. The cake volumes of the finished cake were measured and the cake scored the day after the cakes were baked.

The scale on which the cakes were scored, is as follows:

LAYER CAKE SCORING CHART

| Cake Volume (30) | | | | | | |
|---|---|---|---|---|---|---|
| Yellow layers | White layers | | Grain (30) | Texture (10) | Symmetry of form (10) | Eating quality (20) |
| 1,200 | 1,100 | 30 | Even close_____ 30 | Soft_____ 10 | Full round_____ 10 | Short and tender_____ 20 |
| 1,175 | 1,075 | 25 | Even sl. open_____ 30 | Med. soft____ 7–9 | Sl. flat top_____ 6–8 | M. short and tender__ 15 |
| 1,150 | 1,050 | 20 | Sl. uneven sl. open_ 27 | Med. hard___ 4–6 | Flat top_____ 4–6 | Sl. gummy_____ 10 |
| 1,125 | 1,025 | 15 | Uneven sl. open____ 24 | Hard_____ 1–3 | Peaked_____ 4–6 | Gummy_____ 5 |
| 1,100 | 1,000 | 10 | Uneven sl. tight____ 21 | | Sl. sunken center___ 2–4 | |
| 1,050 | 950 | 0 | Even open_____ 18 | | Sunken center_____ 0–2 | |
| | | | Uneven open_____ 15 | | | |
| | | | Uneven tight_____ 12 | | | |
| | | | Even tight_____ 10 | | | |

EXAMPLE 1

6 parts of hydrogenated soybean oil and 2 parts of a commercial triglycerol monostearate were dissolved in 8 parts of soybean oil having an iodine value of 116 at 168° F. to form a concentrate. The triglycerol monostearate employed typically has the following characteristics:

| | |
|---|---|
| Percent free fatty acid | 4.1 |
| Saponification value | 125 |
| Percent α-monoglycerides (apparent) | 22.5 |
| Percent α-monoglycerol monostearate | 11 |
| Iodine value | 2.5 |
| Percent free glycerin | 4.2 |
| Physical appearance | (1) |

[1] Reddish-tan, solid.

A diluent was also prepared by dissolving 12 parts of a commercial propylene glycol monostearate containing approximately 52–58% monoester in 72 parts of the soybean oil mentioned above. The resulting clear solution was adjusted to a temperature of 82° F.

55 lbs. of the concentrate were added to 295 lbs. of the diluent over a period of 1½ minutes during which the diluent was agitated. This resulted in the rapid precipitation of a flocculent, coarse solid. The batch temperature rose to 96° F. during agitation reflecting, in part, the heat of crystallization and in part, the sensible heat of the hot concentrate. The batch was agitated for an additional 30 minutes during which it cooled gradually to a temperature between 93° and 95° F. The batch was then processed through a Hydropulse homogenizer at an operating pressure of 1000 p.s.i. and was subsequently agitated for 10 minutes. The homogenized material had a final temperature of 97° F. The product had a creamy white appearance and a viscosity of about 2100 cp. as measured in a Brookfield viscosimeter at 20 r.p.m.

The product remained pourable, fluid and homogeneous during 2 months' storage tests at temperatures ranging from 70° to 105° F. During this period, its baking performance was consistently good.

The physical properties of the product thus obtained were as follows:

X-ray diffraction patterns show that the suspended solids were 100% in the β-phase.

Microscopic examination of the product showed that the solids were needle-like crystals with occasional spheroidal clusters or clumps. The needles measured from about 3 to 5 microns long by about 0.3 to 0.5 micron in diameter. The clusters had an effective diameter between about 12 and 15 microns.

The viscosity of the product as measured in a Brookfield viscosimeter is as follows:

| | | Viscosity, cps. | | |
|---|---|---|---|---|
| | R.p.m. | 1 min. | 2 min. | 4 min. |
| Temperature ° F.: | | | | |
| 70 | 20 | 3,100 | 3,075 | 3,025 |
| 70 | 50 | 1,700 | 1,650 | 2,620 |
| 70 | 100 | 1,020 | 990 | 925 |
| 90 | 20 | 3,400 | 3,200 | 3,000 |
| 105 | 20 | 2,380 | 2,200 | 2,080 |

EXAMPLE 2

A 3500-lbs. batch of a fluid-baking shortening was prepared in accordance with the following procedure:

(1) 560 lbs. of concentrate were prepared by heating a mixture of 210 lbs. of hydrogenated soybean oil, 70 lbs. of triglycerol monostearate and 280 lbs. of soybean oil at a temperature between about 155° and 160° F.

(2) 2940 lbs. of a diluent were prepared by melting 420 lbs. of propylene glycol monostearate (at 110°–130° F.) and adding the melt to 2520 lbs. of liquid soybean oil. The diluent was transferred to a batch-mixing tank and adjusted to a temperature of about 70° F.

(3) With an agitator and a batch recycle pump running, the concentrate was pumped into the batch-mixing tank at a rate of 125 lbs. per minute. Provisions were made to minimize splashing by attaching a splash guard to the discharge end of the concentrate feed line. The discharge of the recycle return line was submerged below the surface of the batch. The agitator speed was 26 r.p.m. (tip speed 3.2 ft. per second). Recycle rate was maintained at 200 lbs. per minute.

After the concentrate had been added, the mixture was homogenized in a colloid mill manufactured by the Chemicolloid Labs. Inc., Model M20ND. Homogenization was continued for 30 minutes. To obtain the desired clearance in the mill, the adjustment housing wheel was rotated ¾ of one turn from the fully closed position. During the homogenization step, the temperature was maintained within 94°–100° F. by means of cooling water to the batch recycle tank.

After 30 minutes of recycling the product through the colloid mill, the product was further homogenized in a Manton-Gualing homogenizer, Type 450K3BS. The recycle pumping rate was reduced from 200 lbs. per minute to 60 lbs. per minute (which was slightly in excess of the homogenizer capacity) and the recycle stream was forced through the first stage of the homogenizer at a pressure of 1000 p.s.i.g.

The capacity of the homogenizer was 54 lbs. per minute. A spring-loaded pressure valve was coupled between the colloid mill inlet and the recycle return line so that the overflow from the mill (6 lbs. per minute) could be recycled back to the batch-mixing tank. Approximately 60 minutes were required to homogenize the entire batch.

After completion of the homogenization step, the agitator in the batch-mixing tank was again turned on, and the homogenized mixture was tempered for 1½ hours at a temperature ranging between 96° and 86° F.

X-ray diffraction patterns of the resulting material showed that the solids of the finished material were over 90% in the β-phase.

EXAMPLE 3

Example 1 was repeated except that following addition of the concentrate to the diluent, the mixture was homogenized for 5 minutes in the Hydropulse homogenizer and then tempered with agitation for 45 minutes, care being taken to avoid incorporation of air into the product.

EXAMPLE 4

Example 3 was repeated, except that the tempering step was extended to 4 hours.

EXAMPLE 5

Example 3 was repeated except that the concentrate was added in two steps. In a first step, 8 parts of a concentrate composed of a 50% solution of hydrogenated soybean oil and liquid soybean oil was added to the diluent. Following addition of the first portion of concentrate, the mixture was agitated for 15 minutes. Thereafter, a second concentrate was added which was a mixture of 4 parts of a 50% solution of hydrogenated soybean oil in soybean oil and 4 parts of a 50% solution of triglycerol monostearate in soybean oil. After addition of the second portion of the concentrate, the product was homogenized for 5 minutes, and tempered with agitation for 30 minutes.

All of the foregoing produced fluid-baking shortenings having acceptable properties from the standpoint of baking performance and emulsion stability. The fluid-baking shortenings of Examples 3 through 5, performed as follows in baking tests:

EFFECT OF PROCESSING VARIABLES ON PRODUCT CHARACTERISTICS

| Example No. | Processing difference from Example 3 | Percent beta-phase of solids | Viscosity 70° F., cps. | Suspension stability, 2 months |
|---|---|---|---|---|
| 3 | | 75 | 4,000 | Good. |
| 4 | Longer agitation | 100 | 2,440 | Do. |
| 5 | Two-step concentrate addition | 85 | 4,800 | Do. |

While hydrogenated soybean oil is the preferred source of the normally solid triglycerides for use in the present invention, other sources may be used. This is illustrated in the following examples wherein a portion of the hydrogenated soybean oil is replaced by hydrogenated rapeseed oil. It will also be observed in the following examples that lower total amounts of the normally solid triglycerides may be present.

EXAMPLE 6

Example 1 was repeated substituting a soybean oil having an iodine value of 117 for the soybean oil of Example 1 as the liquid vehicle. The composition was otherwise identical, that is, it contained approximately 2% triglycerol monostearate, approximately 6% hydrogenated soybean oil and approximately 12% of commercial propylene glycol monostearate having about 52%–58% monoester.

EXAMPLE 7

Example 6 was repeated substituting, for the 6% hydrogenated soybean oil, a mixture of 3.5% hydrogenated soybean oil and 0.5% hydrogenated rapeseed oil. The rapeseed oil stearine had an iodine value of less than about 3. In addition, a soybean oil vehicle having an iodine value of 108 was used.

EXAMPLE 8

Example 7 was repeated employing a soybean oil having an iodine value of 117 as a liquid vehicle in lieu of the soybean oil having an iodine value of 108.

EXAMPLE 9

Example 6 was repeated employing in lieu of the 6% hydrogenated soybean oil, a mixture consisting of 3% hydrogenated soybean oil and 1% hydrogenated rapeseed oil as a normally solid trigylceride. The rapeseed oil stearing had an iodine value of less than about 3.

The preformance of the fluid-baking shortenings of Examples 6 through 9 is set forth in the following table:

EFFECT OF STEARINE SOURCE AND I.V. OF LIQUID SOYBEAN OIL ON PERFORMANCE

| | Percent composition in SBO | | | | | Baking tests (10 days old) | | | | Suspension stability [a] (2 Weeks Old) | | |
|---|---|---|---|---|---|---|---|---|---|---|---|---|
| | Triglycerol monostearate | SBO-HO [b] | RSO-HO [c] | PGMS [d] | I.V. of SBO | White cake Volume, cc. | Score | Yellow cake Volume, cc. | Score | 70° F. | 90° F. | 105° F. |
| Example No.: | | | | | | | | | | | | |
| 6 | 2 | 6 | | 12 | 117 | 1,220 | 94 | 1,275 | 98 | F.H. | F.H. | F.H. |
| 7 | 1 | 3.5 | 0.5 | 12 | 108 | 1,190 | 100 | 1,320 | 99 | F.H. | F.H., v. | ([1]). |
| 8 | 1 | 3.5 | 0.5 | 12 | 117 | 1,200 | 100 | 1,280 | 96 | F.H. | F.H. | F.H. |
| 9 | 1 | 3.0 | 1.0 | 12 | 117 | 1,205 | 95 | 1,245 | 96 | F.H. | F.H. | F.H. |

[a] Nomenclature for suspension stability data:
F.H.=Fluid and homogeneous.
v=Viscous.
[b] Hydrogenated soybean oil i.v.=20.
[c] RSO-HO=Rapeseed oil stearine with Iodine Value of less than 3.
[d] Propyleneglycol monostearate, commercial material used in the indicated amount contains about 52%-58% monoester.
[1] Very viscous.

As mentioned above, it is preferred to employ triglycerol monostearates having an acid/polyglycerol molar ratio between about 1.0 and 2.0. The significance of this preference is illustrated by the following examples.

EXAMPLE 10

A fluid-baking shortening was prepared in accordance with the procedure outlined in Example 1 employing 12% of a commercial propylene glycol monostearate, 2% of a hydrogenated soybean oil and 2% of a triglycerol monostearate of the following typical composition.

Percent free fatty acid _____ 0.53
Free fatty acid (maximum)—1.5%
Iodine value—3.0
Saponification No.—130–135
Hydroxyl No. 330–335
Percent apparent monoglycerides—25%–30%
Free glycerin—2.5%

By calculation from the saponification number and the hydroxyl number it is estimated that the acid/polyglycerol mole ratio is about 1.5.

EXAMPLE 11

A fluid-baking shortening was prepared following the procedure outlined in Example 10, substituting for the triglycerol monostearate, however, a triglycerol monostearate ester having the following characteristics:

Percent free fatty acid _____ 0.53
Saponification value _____ 145
Percent α-monoglycerides (apparent) _____ 32.8
Iodine value _____ 0.66
Percent free glycerin _____ 0

The estimated fatty acid polyglycerol ratio of the polyglycerol ester used in this example is about 2.0.

EXAMPLE 12

A fluid-baking shortening was prepared following the procedure outlined in Example 10, employing however, 6% hydrogenated soybean oil rather than 2%.

EXAMPLE 13

A fluid-baking shortening was prepared in accordance with the procedure outlined in Example 11, employing however, 6% of hydrogenated soybean oil instead of 2%.

shortening followed the procedure outlined generally in Examples 1 and 10, with the following results:

EFFECT OF AMOUNT AND TYPE OF POLYGLYCEROL ESTER ON PERFORMANCE

| | Percent Composition in 108 I.V. SBO | | | | | Baking tests | | | | Suspension stability [a] | | |
|---|---|---|---|---|---|---|---|---|---|---|---|---|
| | Triglycerol Monostearate | Decaglycerol Tristearate | SBO-HO [b] | PGMS [c] | Age of sample | White cake | | Yellow cake | | | | |
| | | | | | | Volume, cc. | Score | Volume, cc. | Score | 70° F. | 90° F. | 105° F. |
| Example No.: | | | | | | | | | | | | |
| 16 | 0.2 | | 6 | 12 | 10 days | 1,170 | 94 | 1,280 | 96 | F.H. | F.H. | F.H. |
| | | | | | 1 month | 1,115 | 100 | 1,235 | 100 | F.H. | F.H. | F.H. |
| 17 | 1.0 | | 6 | 12 | 10 days | 1,215 | 96 | 1,275 | 97 | F.H. | F.H. | F.H. |
| | | | | | 1 month | 1,160 | 96 | 1,245 | 97 | F.H. | Sl. sep'n | Sl. sep'n. |
| 18 | | 0.2 | 6 | 12 | 10 days | 1,110 | 93 | 1,250 | 97 | F.H. | F.H. | F.H. |
| | | | | | 1 month | 1,095 | 98 | 1,295 | 97 | F.H. | Sl. sep'n | Sl. sep'n. |
| 19 | | 1.0 | 6 | 12 | 10 days | 1,110 | 94 | 1,200 | 98 | F.H. | F.H. | F.H. |
| | | | | | 1 month | 1,155 | 97 | 1,200 | 97 | F.H. | Sl. sep'n | Sl. sep'n. |
| 20 | 2.0 | | 6 | 12 | 10 days | 1,245 | 98 | 1,245 | 100 | F.H. | Gel | F.H. |
| 21 | | 2.0 | 6 | 12 | do | 1,085 | 90 | 1,200 | 98 | F.H. | Gel | F.H., v. |

[a] Nomenclature for suspension stability data:
F.H.=Fluid and homogeneous.
Sl. sep'n=slight separation (less than 0.5 cm. in 10 cm. of height).
Sep'n=separation (between 0.5 and 1.5 cm. in 10 cm. of height).
Gel=Gelation.
V=viscous.
[b] Hydrogenated soybean oil i.v.=20.
[c] Propylene glycol monostearate, 52%-58% monoester.

EXAMPLE 14

A fluid-baking shortening was prepared in accordance with the procedure outlined in Example 10, employing however, 1% of triglycerol monostearate rather than 2%.

EXAMPLE 15

A fluid-baking shortening was prepared in accordance with the procedure outlined in Example 11 employing however, 1% of triglycerol monostearate rather than 2%.

The fluid-shortenings prepared in Examples 10 through 15 were evaluated with the following results:

As discussed above, an important aspect of the present invention is the discovery of a novel combination of emulsifiers which permits the manufacture of a fluid-baking shortening. The presence of the particular combination of emulsifiers produces wholly unpredictable results as may be seen from the following examples in which comparisons are made between the separate and combined effect of the various emulsifiers employed in the present invention.

In the following examples, a series of fluid-baking shortenings was prepared following generally the procedure outlined in Example 1 modified, however, by employing emulsifier combinations of the compositions indicated in the table.

EFFECT OF POLYGLYCEROL ESTERS ON BAKING PERFORMANCE

| | Percent comparison in 108 IV SBO [a] | | | | Baking tests (1 week old) | | | | | Suspension stability [d] | | |
|---|---|---|---|---|---|---|---|---|---|---|---|---|
| Ex. No. | Triglycerol Acid/ PG[f]=1.5 | Monostearate Acid/ PG[f]=2.0 | SBO[b]-HO | PGMS[c] | White cake | | Yellow cake | | Age of sample | 70° F. | 90° F. | 105° F. |
| | | | | | Volume, cc. | Score | Volume, cc. | Score | | | | |
| 10 | 2 | | 2 | 12 | 1,185 | 98 | 1,275 | 98 | 2 months | Sl. sep'n | Gel | F.H. |
| 11 | | 2 | 2 | 12 | 1,175 | [e] 89 | 1,290 | [e] 94 | 1 month | Sep'n | V., grainy | Sep'n. |
| 12 | 2 | | 6 | 12 | 1,245 | 98 | 1,245 | 100 | do | F.H. | F.H., v. | F.H. |
| 13 | | 2 | 6 | 12 | 1,155 | [e] 92 | 1,250 | [e] 95 | do | H. sep'n | H. sep'n | H. sep'n. |
| 14 | 1 | | 6 | 12 | 1,215 | 96 | 1,275 | 97 | do | F.H. | Sl. sep'n | Sl. sep'n. |
| 15 | | 1 | 6 | 12 | 1,130 | [e] 78 | 1,280 | [e] 95 | do | F.H. | Gel | Gel. |

[a] SBO=soybean oil.
[b] SBO-HO=hydrogenated soybean oil.
[c] PGMS=propylene glycol monostearate, 52%-58% monoester.
[d] Nomenclature for suspension stability data:
F.H.=Fluid and homogeneous.
Sl. sep'n=slight separation (less than 0.5 cm. in 10 cm. of height).
Sep'n=separation (between 0.5 and 1.5 cm. in 10 cm. of height).
H. sep'n=heavy separation (greater than 1.5 cm. in 10 cm. of height).
Gel=gelation.
V=viscous.
[e] Lower scores for the products prepared with polyglycerol ester having an acid/PGe ratio of 2.0 reflect course grain and poor texture in white cakes and blow-holes and poor texture in yellow cakes.
[f] Acid/polyglycerol molar ratio.

Further illustrations of the effect of type and amount of polyglycerol ester are illustrated in Examples 16 through 21. In these examples, comparison was made between varying amounts of triglycerol monostearate and varying amounts of decaglycerol tristearate. The triglycerol monostearate employed in these examples is the material described in Examples 10, 12 and 14 above. The procedure for the preparation of the fluid-baking It will be observed that of Examples 22 through 29, only Examples 25 and 27 illustrate emulsifiers within the scope of the present invention. It will be seen that many of the remaining materials performed so poorly that testing was not indicated while those of the remaining materials which performed well enough to justify testing failed to yield satisfactory cake volume or baking performance in all tests.

SEPARATE AND COMBINED EFFECTS OF EMULSIFIERS

| Percent composition in 108 I.V. SBO | | | | Household baking tests | | | | |
| --- | --- | --- | --- | --- | --- | --- | --- | --- |
| Triglycerol Monostearate [d] | SBO-HO [e] | PGMS [f] | Age of sample | White layer | | Yellow layer | | Suspension stability, at 90° F. |
| | | | | Volume, cm.³ | Score | Volume, cm.³ | Score | |
| Example No.: | | | | | | | | |
| 22 [a] | 2 | | 1 week | 1,080 | 72 | ([1]) | ([1]) | Very poor, separation. |
| 23 [a] | 3 | | do | 1,060 | 66 | ([1]) | ([1]) | Do. |
| 24 [a] | 2 | 2 | do | 1,085 | 71 | ([1]) | ([1]) | Fluid, homogeneous. |
| 25 [a] | 2 | 2 | 12 do | 1,140 | 97 | 1,310 | 97 | Do. |
| 26 [a] | | 2 | 12 do | 1,080 | 90 | 1,280 | 95 | Do. |
| 27 [b] | 2 | 2 | 12 do | 1,185 | 98 | 1,275 | 98 | Do. |
| 28 [b] | | 2 | 12 do | 1,020 | 78 | 1,200 | 96 | Do. |
| 29 [c] | | | 12 do | 1,020 | 23 | 1,295 | 98 | Clear solution. |

[a] Prepared by rapidly chilling a melt of all formula ingredients from 140° F. to 70° F., followed by agitation for 1 hour at 90°–100° F.
[b] Prepared by the method of the percent invention.
[c] Preparation involves dissolving PGMS in SBO; the resultant product is a clear solution at room temperature.
[d] The triglycerol monostearate acid is described in Example 10.
[e] Hydrogenated soybean oil i.v.=20.
[f] Propylene glycol monostearate, 52%–58% monoester.
[1] Not tested.

I claim:

1. A fluid shortening consisting essentially of
    (a) from 0.1% to 4% by weight of at least one ester of a polyglycerol having an average of from 2 to 10 glycerin units and less than 25% by weight free glycerin said polyglycerol being esterified with from 1 to 3 moles per mole of polyglycerol of an unsubstituted aliphatic acid having from 14 to 22 carbon atoms and an iodine value of not more than about 50;
    (b) from about 1% to about 10% by weight of at least one normally solid triglyceride of an unsubstituted aliphatic acid having from 12 to 22 carbon atoms and an iodine value of not more than about 20;
    (c) from about 2% to about 15% by weight of at least one ester of propylene glycol with a substantially saturated unsubstituted aliphatic acid having from 14 to 22 carbon atoms, said propylene glycol ester having an iodine value of not more than about 10; and
    (d) the balance of said composition being essentially at least one edible normally liquid triglyceride; said polyglycerol ester (a) and said normally solid triglyceride (b) being in the form of a stable suspension of solid crystals of fat predominantly in the beta phase, suspended in said normally liquid triglyceride vehicle (d) having said propylene glycol ester (c) dissolved therein, the major portion of said suspended fats having particle diameters between about 0.3 and about 15 microns, and said shortening having solid fat index values within the following ranges.

| Temp., ° C.: | Solid fat index |
| --- | --- |
| 0 | 15–25 |
| 21.1 | 7–15 |
| 33.3 | 4–12 |
| 42.0 | 3–12 |

2. A fluid shortening according to claim 1 wherein said liquid triglyceride is at least one oil selected from the group consisting of peanut oil, rapeseed oil, corn oil, cottonseed oil, soybean oil and safflower oil.

3. A fluid shortening according to claim 1 wherein said liquid vehicle is soybean oil.

4. A fluid shortening according to claim 1 wherein said solid triglyceride is at least one triglyceride of $C_{16}$ and $C_{18}$ fatty acids having an iodine value of not more than about 20.

5. A fluid shortening according to claim 1 wherein said solid triglyceride is selected from the group consisting of hydrogenated rapeseed oil, hydrogenated cottonseed oil, hydrogenated lard, hydrogenated tallow, hydrogenated peanut oil, and hydrogenated ucuhaba oil.

6. A liquid shortening according to claim 1 wherein said solid triglyceride is selected from the group consisting of hydrogenated coconut oil, hydrogenated babassu oil, hydrogenated palm kernel oil and hydrogenated ouricuri oil, said hydrogenated oil having an iodine value of less than about 2.

7. A fluid shortening according to claim 1 wherein said polyglycerol ester is in a concentration between about 0.2 and 2% by weight.

8. A fluid shortening according to claim 1 wherein said propylene glycol monostearate is present in an amount between about 6% and 12% by weight.

9. A fluid shortening according to claim 1 wherein said propylene glycol monoester is the ester of at least one acid selected from the group consisting of $C_{16}$ and $C_{18}$ saturated fatty acids.

10. A process for the preparation of a fluid shortening comprising the steps of:
    (a) dissolving (i) from about 0.1 to about 4 parts by weight of at least one ester of a polyglycerol having an average of from 2 to 10 glycerin units and less than about 25% free glycerin said polyglycerol being esterified with from 1 to 3 moles, per mole of polyglycerol, of an unsubstituted aliphatic acid having from 14 to 22 carbon atoms and an iodine of not more than about 50, and (ii) from 1 to 10 parts by weight of a normally solid triglyceride of an unsubstituted aliphatic acid having from 12 to 22 carbon atoms and an iodine value of not more than about 20, in (iii) a sufficient amount of an edible, normally liquid triglyceride vehicle to form a concentrate having between about 30% and 60% by weight of said polyglycerol (i) and said normally solid glyceride (ii), said concentrate being at a temperature sufficient to yield a clear liquid;
    (b) dissolving (iv) from 2 to 15 parts by weight of at least one ester of propylene glycol with an aliphatic acid having from 14 to 22 carbon atoms, said ester having an iodine value of not more than about 10, in from 70 to 98 parts by weight of a further portion of said normally liquid triglyceride (iii), thereby to form a diluent, said diluent being at a temperature between about 60° and 90° F.;
    (c) adding said concentrate (a) to said diluent (b) while agitating the latter, thereby precipitating said polyglycerol ester (i) and said normally solid triglyceride (ii); and
    (d) comminuting and tempering said precipitated fats to form a stable suspension of fat crystals at least 75% thereof being in the beta phase, a major portion of said crystals having particle sizes between about 0.3 and about 15 microns, said suspension being characterized by solid-fat index values within the following ranges.

| Temp., ° C.: | Solid fat index |
| --- | --- |
| 0 | 15–25 |
| 21.1 | 7–15 |
| 33.3 | 4–12 |
| 42.0 | 3–12 |

11. A process according to claim 10 wherein said propylene glycol ester and said normally liquid triglyceride are combined with each other at a temperature between about 100° and 110° F., and then cooled to a temperature between about 60° and 90° F.

12. A process according to claim 10 wherein said concentrate is prepared at a temperature between about 150° F. and 180° F.

13. A process according to claim 10 wherein said concentrate is prepared at a temperature betwen about 155° F. and 168° F.

14. A process according to claim 10 wherein said fluid shortening is tempered for a period of from ½ to 1½ hours following said comminuting step (d).

15. A process according to claim 10 wherein said liquid triglyceride is at least one oil selected from the group consisting of peanut oil, rapeseed oil, corn oil, cottonseed oil, soybean oil and safflower oil.

16. A process according to claim 10 wherein said liquid triglyceride is soybean oil.

17. A process according to claim 10 wherein said solid triglyceride is at least one triglyceride of $C_{16}$ and $C_{18}$ fatty acids having an iodine value of not more than about 20.

18. A process according to claim 10 wherein said solid triglyceride is selected from the group consisting of hydrogenated rapeseed oil, hydrogenated cottonseed oil, hydrogenated lard, hydrogenated tallow, hydrogenated peanut oil, and hydrogenated ucuhaba oil.

19. A process according to claim 10 wherein said solid triglyceride is selected from the group consisting of hydrogenated coconut oil, hydrogenated babassu oil, hydrogenated palm gernel oil and hydrogenated ouri-curi oil, said hydrogenated oil having an iodine value of less than about 2.

20. A process according to claim 10 wherein said polyglycerol ester is in a concentration between about 0.2 and 2% by weight.

21. A process according to claim 10 wherein said propylene glycol ester is present in an amount between about 6% and 12% by weight.

22. A process according to claim 10 wherein said propylene glycol ester is the ester of at least one acid selected from the group consisting of $C_{16}$ and $C_{18}$ saturated fatty acids.

References Cited

UNITED STATES PATENTS

| | | | |
|---|---|---|---|
| 2,023,388 | 12/1935 | Harris | 260—410.6 |
| 2,132,416 | 10/1938 | Harris | 99—123 |
| 2,864,705 | 12/1958 | Schulman | 99—118 |
| 2,875,065 | 2/1959 | Thompson | 99—118 |
| 3,145,110 | 8/1964 | Abbott | 99—123 |
| 3,325,292 | 6/1967 | Endres et al. | 99—118 |

OTHER REFERENCES

Nash, Nat H. et al., The Baker's Digest, October 1963, pp. 72–75.

MAURICE W. GREENSTEIN, Primary Examiner

U.S. Cl. X.R.

99—123

PO-1050
(5/69)

UNITED STATES PATENT OFFICE
CERTIFICATE OF CORRECTION

Patent No. 3,528,823      Dated September 15, 1970

Inventor(s)     Jack L. Rossen

It is certified that error appears in the above-identified patent and that said Letters Patent are hereby corrected as shown below:

Column 7, line 73, "2620" should be --1620--;

Column 8, line 36, "hatch" should be --batch--;

Columns 11 and 12 (table), line 50, "sep'n" should be --h.sep'n--;

Columns 13 and 14, footnote b, "percent" should be --present--.

Signed and sealed this 27th day of April 1971.

(SEAL)
Attest

EDWARD M. FLETCHER, JR.      WILLIAM E. SCHUYLER, JR.
Attesting Officer             Commissioner of Patents